UNITED STATES PATENT OFFICE.

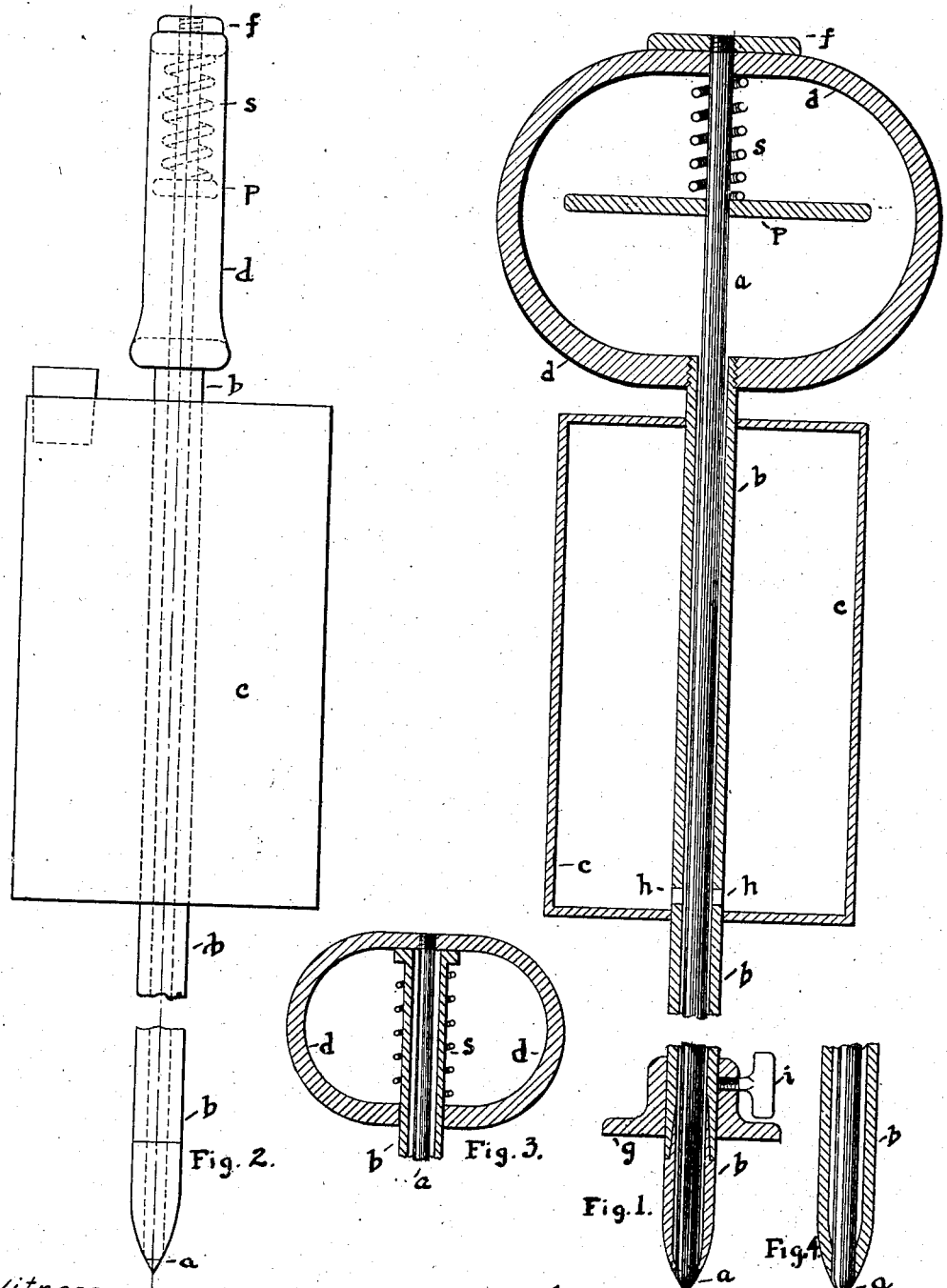

JAMES SAGUIN, OF COUNCIL BLUFFS, IOWA.

EARTH-SYRINGE.

No. 891,376.

Specification of Letters Patent.

Patented June 23, 1908.

Application filed September 3, 1907. Serial No. 391,274.

*To all whom it may concern:*

Be it known that I, JAMES SAGUIN, a citizen of the United States, residing at Council Bluffs, in the county of Pottawattamie and State of Iowa, have invented a new and useful Earth-Syringe, of which the following is a specification.

My invention relates to earth syringes in which a closed pointed tube supplied with the desired fluid has a means of opening to allow the fluid to escape.

The objects of my invention are; first, to provide a means for injecting underneath the soil and about the roots of plants or weeds, fluids for various purposes; second, to provide a means whereby a single insertion and withdrawal will automatically inject such material underneath the surface of the ground or into whatever material the same may be inserted; third, to provide a means for limiting the depth of insertion of such device; fourth, to provide a means whereby damaging fluids can be inserted at the roots of obnoxious weeds for the purpose of destroying them without injury to surrounding plants. I attain these objects by the device illustrated in the accompanying drawing in which:—

Figure 1 is a cross section of the syringe. Fig. 2 is a side elevation of the same. Fig. 3 is a sectional detail illustrating a modification in the construction of the operating handle or grip. Fig. 4 is a sectional detail of the modified form of the penetrating point of the improved device.

The improved device comprises a tubular member $b$ converging at the lower end to produce a relatively limited discharge aperture and also to produce a "point" to enable the tubular member to be inserted more readily into the earth. Extending through the tubular member $b$ is a rod $a$ with its lower end pointed and adapted to close the contracted aperture at the point of discharge of the tubular member $b$ and thus serve as a valve element as will be obvious. Surrounding the tubular member $b$ is a tank $c$ and the tubular member has apertures at the lower part of the tank, so that the contents of the tank will flow into the tubular member.

In Figs. 1 and 2 a handle $d$ is attached to the upper end of the tubular member $b$, while the rod $a$ extends through the handle member and is provided with a plate $f$ upon its upper end above the handle. Attached to the rod $a$ within the handle member is a hand grip $p$ and between the grip and the upper portion of the handle is arranged a spring $s$, operating between the handle and the grip $p$ to maintain the rod $a$ yieldably in its downward position, and normally closing the discharge at the point of the tubular member. By this arrangement it will be obvious that so long as the implement remains in inoperative position the liquid in the tank $c$ will be retained, and will flow from the implement when the grip $p$ is elevated against the spring $s$ carrying the rod $a$ with it.

With the implement thus described, when it is desired to deposit a liquid around the roots of plants for any purpose it is only necessary to thrust the pointed end of the tubular member $b$ into the soil, elevate the rod $a$ by pressure applied to the grip $p$ and hold the rod elevated until the required quantity of liquid has flowed from the tank, and it is obvious that the quantity of liquid may be readily gaged by holding the rod $a$ in its elevated position for a greater or lesser length of time.

Surrounding the tubular member $b$ between the tank $c$ and its penetrating point is a collar $g$ provided with a clamp bolt $i$, so that the collar may be adjusted longitudinally of the tubular member, the collar serving as a stop to control the distance in which the tubular member will enter the soil.

The tubular member $b$ may be in two parts as illustrated in Fig. 1, or in one single piece, as illustrated in Fig. 4, but will preferably be in two pieces as illustrated in Fig. 1, to enable the point to be removed when worn or broken, for obvious reasons. In Fig. 3 is shown a modified construction of the handle member, and the means of connecting the handle to the other parts. In this modified structure the tubular member $b$ extends through the handle and bears against its upper part and is provided with a lateral shoulder between which and the lower portion of the handle the spring $s$ is arranged, the rod $a$ extending above the tubular member and rigidly connected to the handle. By this arrangement, when the implement is to be employed it is thrust into the soil by pressure upon the handle in the same manner as in the structure shown in Figs. 1 and 2, and when the liquid is to be discharged the handle $d$ is simply moved upwardly against the resistance of the spring $s$, which will operate the rod $a$ and permit the discharge of the liquid, the resistance of the soil being generally sufficient to retain the tubular member *b* in position, but if necessary the tubular member may be held in its downward position by one hand and actuated by the other hand.

The amount of liquid that will pass through the syringe into the substance pierced by it, will depend upon the length of time employed in withdrawing it and can be so regulated. In this manner the roots of poison ivy, dandelions and other plants can be supplied with killing liquids without digging up the ground and without injuring other surrounding vegetation. Suitable nourishing fluids can also be applied to plants at the proper place. The force of gravity is used to propel the liquid into the substance pierced.

Having thus described my invention, what I desire to secure by Letters Patent is:—

1. A device of the class described comprising a tubular stock converging at one end to produce a contracted discharge aperture and having oppositely disposed apertures intermediate its ends, a tank surrounding the stock and the intermediate apertures thereof, a handle formed with spaced sides and detachably connected at one side to said stock, a rod extending through the stock and pointed at one end to form a valve for the contracted discharge aperture of said stock and extending at the other end through the handle, a stop element carried by the rod and bearing upon the handle, a grip element carried by said rod within the handle, a spring embracing the rod between the handle and grip element to maintain the valve normally closed and permit of an opening of the valve by a pulling action upon the rod against the tension of the spring, and means carried by the stock to control the depth of penetration.

2. A device of the character described comprising a tubular stock having one end converging into a contracted discharge aperture and having apertures intermediate its ends, a tank embracing the stock and its intermediate apertures, a rod extending through the stock and pointed at one end to form a valve for the contracted discharge aperture, a handle secured to the rod a gripping element, and a spring embracing the rod between the handle and gripping element whereby the valve is opened by a pulling action upon the rod against the action of said spring.

3. A device of the class described comprising a tubular stock converging at one end to produce a contracted discharge aperture and with intermediate oppositely disposed transverse apertures, a tank surrounding the tubular stock and the transverse apertures thereof, a rod extending through said stock and pointed at one end to form a valve for the discharge aperture of the stock, a handle, and a spring operating between the handle and the rod to maintain the rod yieldably in closed position and permit of removal of the rod from its closed position by a pulling action upon the same.

JAMES SAGUIN.

Witnesses:
ETHEL HEISLER,
CLEM. F. KIMBALL.